(12) United States Patent
Chi et al.

(10) Patent No.: US 10,749,226 B2
(45) Date of Patent: Aug. 18, 2020

(54) BATTERY MODULE, AND BATTERY PACK AND VEHICLE COMPRISING THE SAME

(71) Applicant: LG Chem, Ltd., Seoul (KR)

(72) Inventors: Ho-June Chi, Daejeon (KR); Se-Won Kim, Daejeon (KR); Jeong-O Mun, Daejeon (KR); Byoung-Cheon Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 175 days.

(21) Appl. No.: 15/760,823

(22) PCT Filed: Jan. 26, 2017

(86) PCT No.: PCT/KR2017/000976
§ 371 (c)(1),
(2) Date: Mar. 16, 2018

(87) PCT Pub. No.: WO2017/217633
PCT Pub. Date: Dec. 21, 2017

(65) Prior Publication Data
US 2018/0269548 A1 Sep. 20, 2018

(30) Foreign Application Priority Data

Jun. 13, 2016 (KR) .......................... 10-2016-0073359

(51) Int. Cl.
*H01M 10/625* (2014.01)
*H01M 10/6551* (2014.01)
(Continued)

(52) U.S. Cl.
CPC ........... *H01M 10/625* (2015.04); *B60L 50/50* (2019.02); *H01M 2/10* (2013.01); *H01M 2/1077* (2013.01);
(Continued)

(58) Field of Classification Search
CPC ............. H01M 10/625; H01M 10/613; H01M 10/653; H01M 10/6551; H01M 10/6554;
(Continued)

(56) References Cited

U.S. PATENT DOCUMENTS

2010/0330408 A1 12/2010 Yoon et al.
2012/0021260 A1* 1/2012 Yasui .................. F28D 15/0275
429/53
(Continued)

FOREIGN PATENT DOCUMENTS

CN 101855748 A 10/2010
CN 102884673 A 1/2013
(Continued)

OTHER PUBLICATIONS

Machine English translation of KR 10-2014-0039350 A published Apr. 2, 2014 (KR 10-2014-0039350 A with English abstract already of record in IDS filed Mar. 16, 2018).
(Continued)

*Primary Examiner* — Jimmy Vo
(74) *Attorney, Agent, or Firm* — Morgan, Lewis & Bockius LLP (57) ABSTRACT

Disclosed is a battery module, as well as a battery pack and a vehicle comprising the same. The battery module includes a plurality of battery cells, each having an accommodation portion in which an electrode assembly is accommodated and a sealing portion for sealing the accommodation portion, thermal-conductive sheets configured to surround at least a part of the battery cells in surface contact with the battery cells, side cooling fins located at an inner side of the thermal-conductive sheets and at least partially in contact with the accommodation portions of the battery cells, and a cooling plate in contact with the thermal-conductive sheet.

14 Claims, 10 Drawing Sheets

(51) Int. Cl.
  *H01M 10/6555* (2014.01)
  *H01M 2/10* (2006.01)
  *B60L 50/50* (2019.01)
  *H01M 10/653* (2014.01)
  *H01M 10/613* (2014.01)
  *H01M 10/6554* (2014.01)
  *H01M 10/6556* (2014.01)
  *B60L 58/26* (2019.01)

(52) U.S. Cl.
  CPC ....... *H01M 10/613* (2015.04); *H01M 10/653* (2015.04); *H01M 10/6551* (2015.04); *H01M 10/6554* (2015.04); *H01M 10/6555* (2015.04); *B60L 58/26* (2019.02); *H01M 10/6556* (2015.04); *H01M 2220/20* (2013.01)

(58) Field of Classification Search
  CPC ......... H01M 10/6555; H01M 10/6556; H01M 2/10; H01M 2/1077
  See application file for complete search history.

(56) References Cited

U.S. PATENT DOCUMENTS

| | | |
|---|---|---|
| 2013/0040175 A1 | 2/2013 | Yang et al. |
| 2013/0045410 A1 | 2/2013 | Yang et al. |
| 2013/0071700 A1 | 3/2013 | Hsu et al. |
| 2015/0064535 A1 | 3/2015 | Seong et al. |
| 2015/0221996 A1 | 8/2015 | Jin |
| 2015/0311484 A1* | 10/2015 | Katayama ........... H01M 2/1077 429/94 |
| 2016/0233465 A1 | 8/2016 | Lee et al. |

FOREIGN PATENT DOCUMENTS

| | | |
|---|---|---|
| CN | 102893449 A | 1/2013 |
| CN | 103022588 A | 4/2013 |
| CN | 103840234 A | 6/2014 |
| CN | 104412439 A | 3/2015 |
| JP | 2013-247024 A | 12/2013 |
| KR | 2014-0039350 A | 4/2014 |
| KR | 2014-0110233 A | 9/2014 |
| KR | 2015-0127863 A | 11/2015 |
| KR | 2016-0016516 A | 2/2016 |

OTHER PUBLICATIONS

International Search Report dated May 31, 2017, for International Application No. PCT/KR2017/000976 (5 pages).

Office Action and Search Report dated Jun. 23, 2020, issued in corresponding Chinese Patent Application No. 201780003538.

* cited by examiner

BATTERY MODULE, AND BATTERY PACK AND VEHICLE COMPRISING THE SAME

TECHNICAL FIELD

The present disclosure relates to a battery module having a plurality of secondary batteries, and a battery pack and a vehicle comprising the same, and more particularly, to a battery module capable of cooling a battery cell, and a battery pack and a vehicle comprising the same.

The present application claims priority under 35 U.S.C. § 119 to Korean Patent Application No. 10-2016-0073359 filed on Jun. 13, 2016 in the Republic of Korea, and under 35 U.S.C. § 365 to PCT/KR2017/000976 filed on Jan. 26, 2017, the disclosures of which are incorporated herein by reference.

BACKGROUND ART

Secondary batteries are highly applicable to a wide range of products and have electrical characteristics with high energy density. Such secondary batteries are applied not only to portable electronic devices but also to electric vehicles, hybrid vehicles, and electric power storage devices, driven by electric driving sources.

A battery pack applied to an electric vehicle and the like is configured so that a plurality of battery modules, each having a plurality of battery cells, are connected to obtain a high output. Each battery cell is an electrode assembly and may be repeatedly charged and discharged by an electrochemical reaction among components including a positive electrode current collector, a negative electrode current collector, a separator, an active material, an electrolyte and the like.

Meanwhile, along with an increased need for a large capacity structure and utilization as energy storage sources in recent years, there is a growing demand for a multi-module battery pack in which a plurality of battery modules, each having a plurality of secondary batteries connected in series and/or in parallel, are aggregated.

A battery pack of a multi-module structure is manufactured so that a plurality of secondary batteries are densely packed in a narrow space, and thus it is important to easily discharge the heat generated from each secondary battery. The secondary battery is charged or discharged by means of electrochemical reactions as described above. Thus, if the heat of the battery module generated during the charging and discharging process is not effectively removed, heat accumulation occurs. In addition, the deterioration of the battery module is promoted, and in occasions, ignition or explosion may occur.

Therefore, a high-output large-capacity battery module, or a battery pack having the same, requires a cooling device that cools battery cells included therein.

Generally, the cooling device is classified into two types of cooling device, namely an air cooling type and a water cooling type, but the air cooling type is more widely used than the water cooling type due to short circuit or water-proofing of the secondary battery.

Since one battery cell may not produce a large power, a commercially available battery module generally includes a plurality of battery cells as many as necessary so as to be stacked and packaged in a module case. In addition, in order to keep the temperature of the secondary battery at a proper level by cooling the heat generated while individual battery cells are producing electricity, a plurality of cooling fins corresponding to the area of the battery cells are inserted as a heat dissipating member throughout the battery cells. The cooling fins are made of aluminum. The cooling fins absorbing heat from each battery cell are connected to a single cooling plate to transfer the heat to the cooling plate. The cooling plate transfers the heat, received from the cooling fins, to a heat sink, and the heat sink is cooled by cooling water or cooling air.

However, if a cooling fin made of aluminum, it is difficult to make close contact with the battery cell. In addition, at the present, the battery module tends to have a gradually increasing current density. Also, if the battery module has a high energy density, the amount of heat generated from every battery cell becomes large, and so there is a limit in cooling the battery cells just with the cooling fins having constant thermal conductivity.

DISCLOSURE

Technical Problem

The present disclosure is designed to solve the problems of the related art, and therefore the present disclosure is directed to providing a battery module with improved cooling efficiency, a battery pack including the battery module, and a vehicle including the battery pack.

In addition, the present disclosure is directed to providing a battery module capable of improving cooling efficiency of an edge portion and a sealing portion of a battery cell, a battery pack including the battery module, and a vehicle including the battery pack.

The present disclosure is not limited thereto, and other objects not mentioned herein may be clearly understood by those skilled in the art from the following description.

Technical Solution

The present disclosure provides a battery module having a plurality of battery cells.

According to an embodiment of the present disclosure, the battery module may include: a plurality of battery cells, each having an accommodation portion in which an electrode assembly is accommodated and a sealing portion for sealing the accommodation portion; a thermal-conductive sheet configured to surround at least a part of the battery cells in surface contact with the battery cells; a side cooling fin located at an inner side of the thermal-conductive sheet and at least partially in contact with the accommodation portions of the battery cells; and a cooling plate in contact with the thermal-conductive sheet.

In an embodiment, at least a part of the side cooling fin may be in contact with the sealing portions of the battery cells, and at least a part of the side cooling fin may be in contact with the thermal-conductive sheet.

In an embodiment, the side cooling fin may include: a receiving portion in which the sealing portion is received; a first ring portion in contact with one side surface of the sealing portion; and a second ring portion in contact with the other side surface of the sealing portion, wherein the first ring portion and the second ring portion may be connected to each other by means of the receiving portion.

In an embodiment, the first ring portion and the second ring portion may respectively have an empty space therein and may be formed to have one open side.

In an embodiment, the first ring portion and the second ring portion may be symmetric to each other based on the receiving portion.

In an embodiment, the sealing portion may be disposed in a folded form at the receiving portion.

In an embodiment, at least a part of each of the first ring portion and the second ring portion may be in contact with a side surface of the accommodation portion of the battery cell, the sealing portion, and the thermal-conductive sheet.

In an embodiment, portions of the thermal-conductive sheet respectively in contact with the first ring portion and the second ring portion may have a rounded shape.

In an embodiment, the thermal-conductive sheet may be made of a graphite sheet, and the side cooling fin may be made of aluminum.

In an embodiment, the battery cell, the side cooling fin and the cooling plate may be disposed side by side in order along a first direction, and the thermal-conductive sheet may be provided to surround both a portion of a surface of the battery cell perpendicular to the first direction and at least a portion of a side surface of the side cooling fin.

In an embodiment, the battery module may further include a cooling pad located between the thermal-conductive sheet and the cooling plate to transfer heat of the thermal-conductive sheet to the cooling plate.

In an embodiment, one surface of the cooling pad may be coupled to the thermal-conductive sheet, the other surface of the cooling pad may be coupled to the cooling plate, and the thermal-conductive sheet coupled to the cooling pad may have a rounded shape.

In an embodiment, the battery module may further include a heat sink in which a cooling fluid flows to exchange heat with the cooling plate.

The present disclosure may provide a battery pack, comprising the battery module described above.

The present disclosure may provide a vehicle, comprising the battery pack described above.

Advantageous Effects

According to an embodiment of the present disclosure, it is possible to improve cooling efficiency of the battery cells by providing a thermal-conductive sheet surrounding the battery cells and side cooling fins which are in contact with sealing portions and edge portions of the battery cells when cooling the battery cells.

The effects of the present disclosure are not limited to the above, and effects not mentioned herein may be clearly understood by those skilled in the art from the specification and the accompanying drawings.

BEST MODE

Hereinafter, embodiments of the present disclosure will be described in more detail with reference to the accompanying drawings. The embodiments of the present disclosure may be modified in various ways, and the scope of the present disclosure should not be construed as being limited to the embodiments described below. The embodiments are provided to more fully illustrate the present disclosure to those skilled in the art. Thus, the shapes of the components in the figures may be exaggerated to emphasize a clearer description. In addition, terms and words used in the specification and the claims should not be construed as being limited to ordinary or dictionary meanings, but interpreted based on the meanings and concepts corresponding to technical aspects of the present disclosure on the basis of the principle that the inventor is allowed to define terms appropriately for the best explanation.

Figure 1:
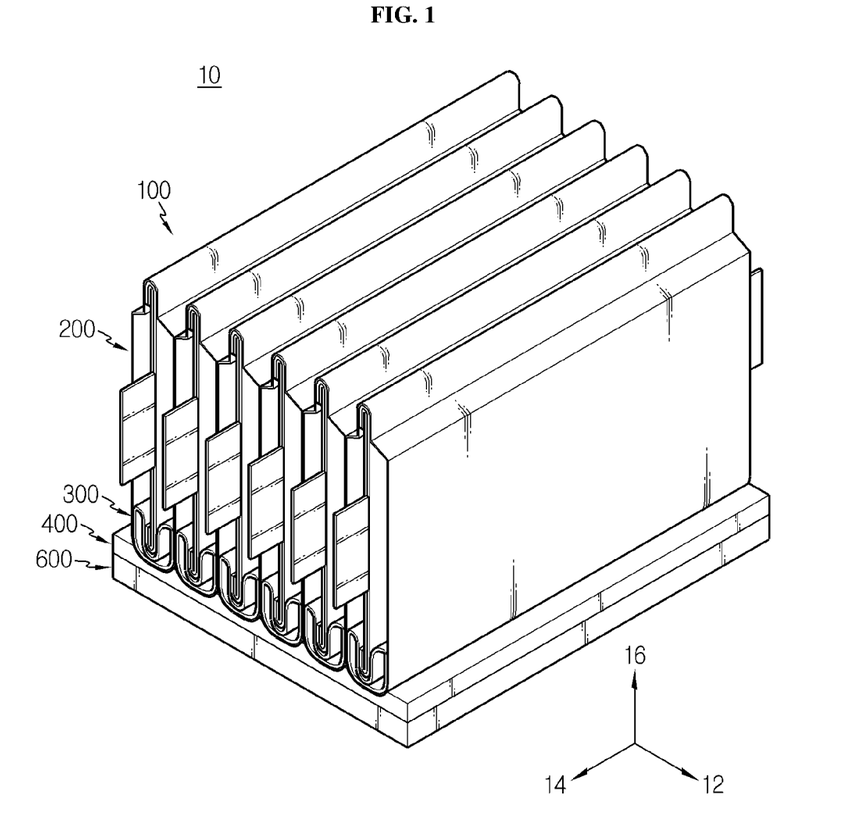
FIG. 1 is a perspective view showing a battery module according to an embodiment of the present disclosure.

FIG. 1 is a perspective view showing a battery module according to an embodiment of the present disclosure.

A battery module 10 has a plurality of battery cells 100. The battery cell 100 may be provided as a secondary battery. For example, the battery cell 100 may be provided as a pouch-type secondary battery. Hereinafter, the battery cell 100 of the present disclosure will be described as a pouch-type secondary battery as an example.

The battery module 10 includes a battery cell 100, a thermal-conductive sheet 200, a side cooling fin 300, a cooling plate 400 and a heat sink 600.

A plurality of battery cells 100 may be provided. The plurality of battery cells 100 are arranged side by side so that their respective faces face each other. The plurality of battery cells 100 are located to face each other. Hereinafter, a direction in which the plurality of battery cells 100 are arranged side by side is referred to as a first direction 12. When being observed from the above, a direction perpendicular to the first direction 12 is referred to as a second direction 14. A direction perpendicular to both the first direction 12 and the second direction 14 is referred to as a third direction 16.

Figure 2:
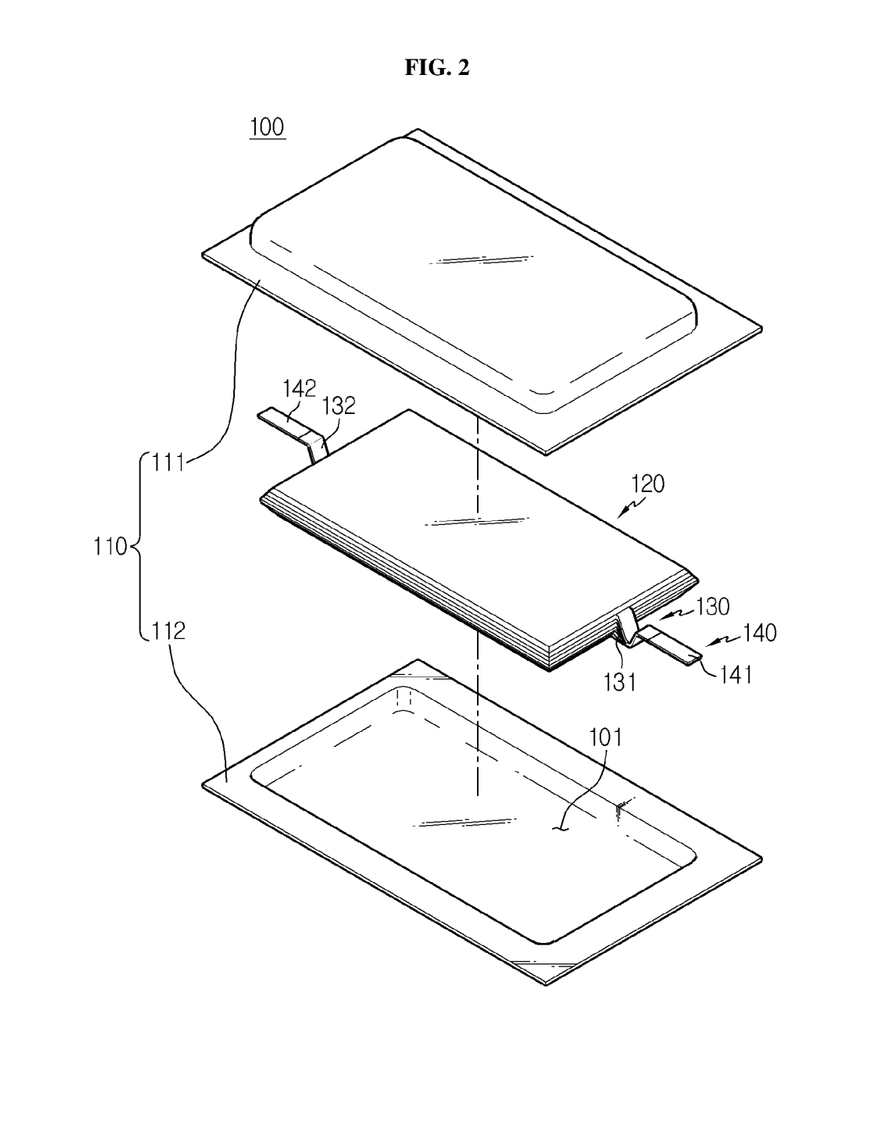
FIG. 2 is an exploded perspective view showing the battery cell of FIG. 1.
Figure 3:
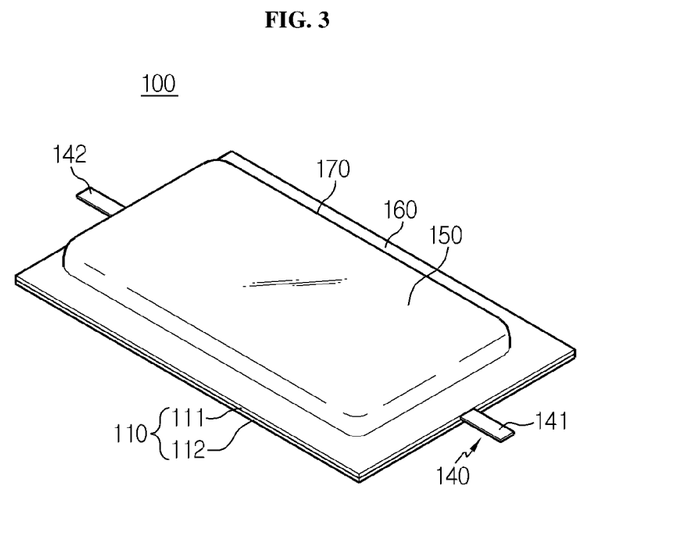
FIG. 3 is a perspective view showing the battery cell of FIG. 1 in an assembled state.

FIG. 2 is an exploded perspective view showing the battery cell of FIG. 1, and FIG. 3 is a perspective view showing the battery cell of FIG. 1 in an assembled state.

Referring to FIGS. 2 and 3, the battery cell 100 includes a pouch case 110, an electrode assembly 120, an electrode tab 130 and an electrode lead 140.

The pouch case 110 has an inner space 101. Inside the pouch case 110, an electrode assembly 120 and an electrolyte, explained later, are positioned. A central region of the pouch case 110 is provided to protrude upward and downward. The pouch case 110 includes an upper case 111 and a lower case 112.

The upper case 111 and the lower case 112 are combined with each other to form the inner space 101. A central region of the upper case 111 has a concave shape protruding upward. The lower case 112 is located under the upper case 111. A central region of the lower case 112 has a concave shape protruding downward. Alternatively, the inner space 101 of the pouch case 110 may be formed in only any one of the upper case 111 and the lower case 112.

The upper case 111 and the lower case 112 respectively have a sealing portion 160. The sealing portion 160 of the upper case 111 and the sealing portion 160 of the lower case 112 may be provided to face each other. The sealing portion 160 of the upper case 111 and the sealing portion 160 of the lower case 112 may be bonded to each other by thermal bonding or the like. The inner space 101 may be sealed by bonding the sealing portions 160.

An electrolyte and an electrode assembly 120 are accommodated in the inner space 101 of the pouch case 110. The pouch case 110 may have an outer insulating layer, a metal layer, and an inner adhesive layer. The outer insulating layer may prevent exterior moisture, gas or the like from penetrating therein. The metal layer may improve the mechanical strength of the pouch case 110. The metal layer may be made of aluminum. Alternatively, the metal layer may be made of any one selected from an alloy of iron, carbon, chromium and manganese, an alloy of iron and nickel, aluminum or equivalents thereof. When the metal layer uses a material containing iron, mechanical strength may be enhanced. When the metal layer is made of aluminum, good ductility may be ensured. Aluminum is a desired material of the metal layer. The outer insulating layer and the inner adhesive layer may be made of a polymer material.

The electrode assembly 120 includes a positive electrode plate, a negative electrode plate, and a separator. The electrode assembly 120 may be configured so that at least one positive electrode plate and at least one negative electrode plate are disposed with a separator being interposed therebetween. The electrode assembly 120 may be configured so that a plurality of positive electrode plates and a plurality of negative electrode plates are alternately stacked. Alternatively, the electrode assembly 120 may also be configured so that one positive electrode plate and one negative electrode plate are wound.

The electrode plate of the electrode assembly 120 includes a current collector and active material slurry coated on one or both sides of the current collector. The active material slurry may be formed by stirring a solvent in a state where a granular active material, an auxiliary conductor, a binder, and a plasticizer are added thereto. Each electrode plate may have an uncoated portion corresponding to a region where the active material slurry is not coated. In the uncoated portion, an electrode tab 130 corresponding to each electrode plate may be formed.

The electrode tab 130 is extended to protrude from the electrode assembly 120. The electrode tab 130 includes a positive electrode tab 131 and a negative electrode tab 132. The positive electrode tab 131 may extend from the uncoated portion of the positive electrode plate, and the negative electrode tab 132 may extend from the uncoated portion of the negative electrode plate.

One positive electrode tab 131 and one negative electrode tab 132 may be provided in the battery cell 100, respectively. Alternatively, a plurality of positive electrode tabs 131 and a plurality of negative electrode tabs 132 may also be provided. For example, if one positive electrode plate and one negative electrode plate are included in the electrode assembly 120 of the battery cell 100, one positive electrode tab 131 and one negative electrode tab 132 may be included. Alternatively, a plurality of positive electrode tabs 131 and a plurality of negative electrode tabs 132 may be included, respectively. If a plurality of positive electrode plates and a plurality of negative electrode plates are included in the electrode assembly 120, a plurality of positive electrode tabs 131 and a plurality of negative electrode tabs 132 may be included, and one electrode tab 130 may be provided to one electrode plate.

The electrode lead 140 may electrically connect the battery cell 100 to other external devices. The electrode lead 140 may include a positive electrode lead 141 and a negative electrode lead 142. The electrode lead 140 may be provided to extend from the inside to the outside of the pouch case 110. A portion of the electrode lead 140 may be interposed between the sealing portions 160. The electrode lead 140 is connected to the electrode tab 130. The electrode lead 140 of the present disclosure may include the positive electrode lead 141 at one side of the pouch case 110 and include the negative electrode lead 142 at the other side of the pouch case 110. Alternatively, both the positive electrode lead 141 and the negative electrode lead 142 may be provided at one side of the pouch case 110.

The battery cell 100 has an accommodation portion 150 and a sealing portion 160. Here, the accommodation portion 150 is a portion where the electrode assembly 120 is accommodated in the battery cell 100. The sealing portion 160 is sealing portions at four sides of the pouch case 110 surrounding the accommodation portion 150. The sealing portion 160 is coupled to a receiving portion 310 of the side cooling fin 300, explained later, and may be provided in a folded form.

Figure 4:
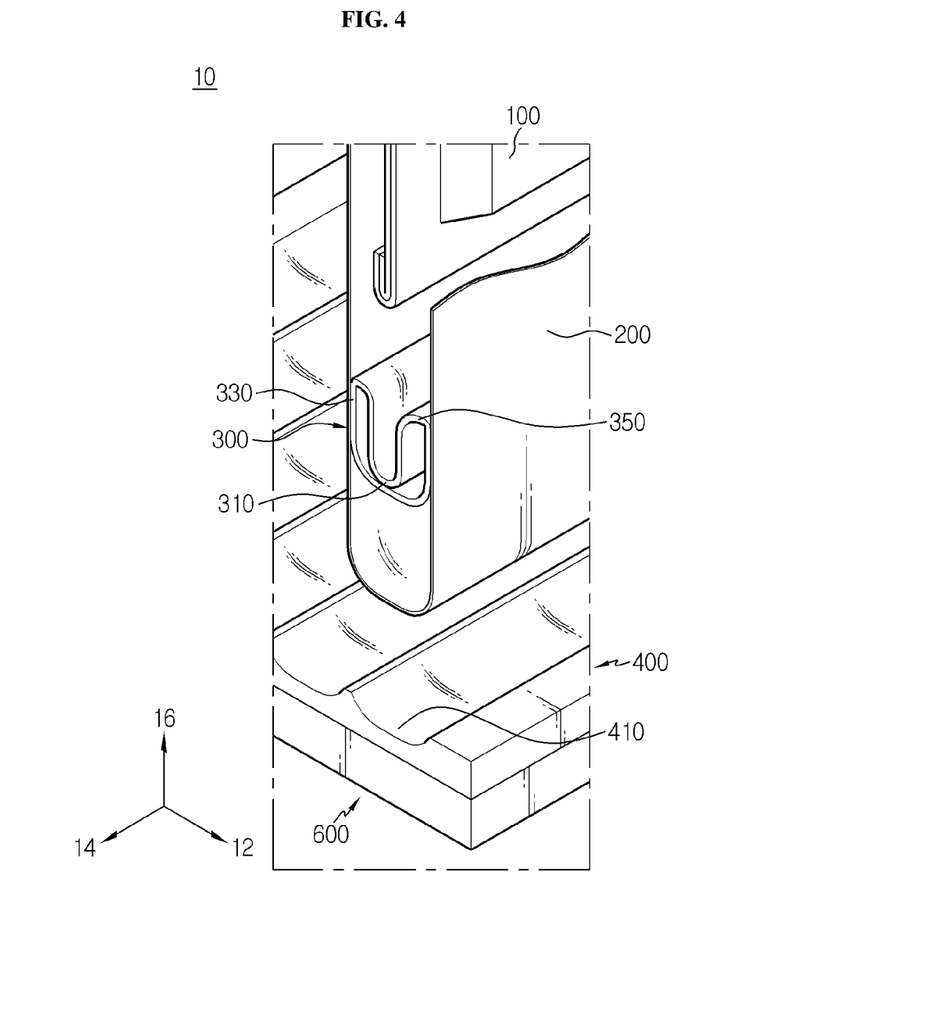
FIG. 4 is a perspective view showing a portion of the battery module of FIG. 1, before battery cells, a thermal-conductive sheet, side cooling fins, a cooling plate and a heat sink are coupled.
Figure 5:
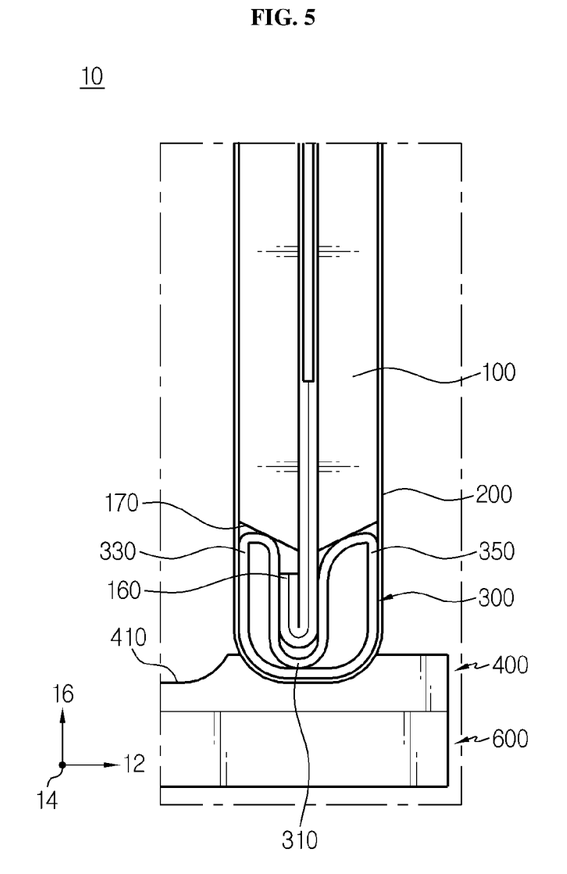
FIG. 5 is a front view showing that the battery cells, the thermal-conductive sheet, the side cooling fins, the cooling plate and the heat sink of FIG. 1 are coupled.
Figure 6:
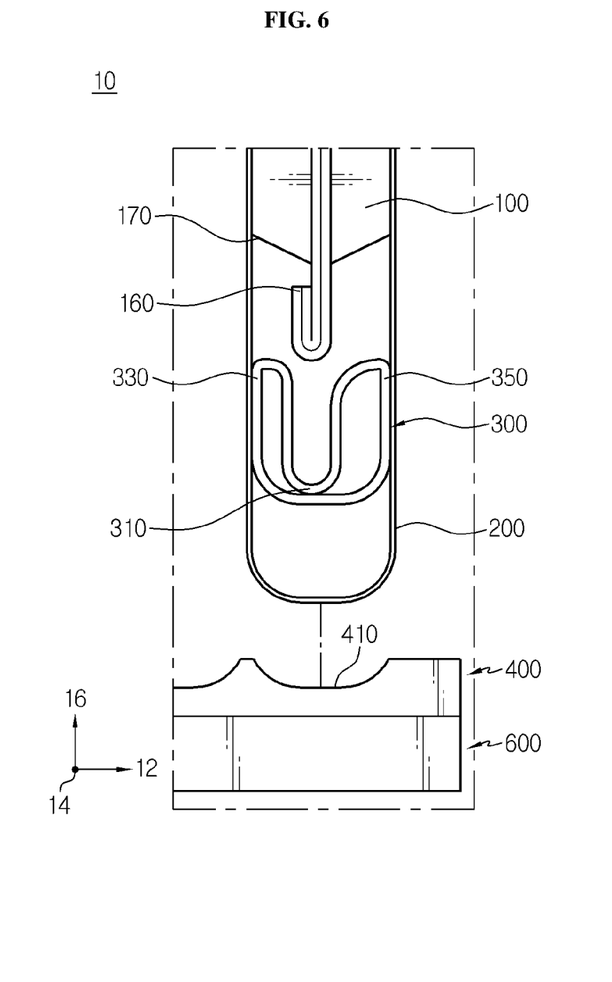
FIG. 6 is a front view showing a state before the battery cells, the thermal-conductive sheet, the side cooling fins, the cooling plate and the heat sink of FIG. 5 are coupled.

FIG. 4 is a perspective view showing a portion of the battery module of FIG. 1, before battery cells, a thermal-conductive sheet, side cooling fins, a cooling plate and a heat sink are coupled, FIG. 5 is a front view showing that the battery cells, the thermal-conductive sheet, the side cooling fins, the cooling plate and the heat sink of FIG. 1 are coupled, and FIG. 6 is a front view showing a state before the battery cells, the thermal-conductive sheet, the side cooling fins, the cooling plate and the heat sink of FIG. 5 are coupled.

Referring to FIGS. 4 to 6, the thermal-conductive sheet 200 may transfer the heat of the battery cell 100 to the cooling plate 400. A plurality of thermal-conductive sheets 200 may be provided. The thermal-conductive sheets 200 may be provided in a number corresponding to the number of the battery cells 100. The thermal-conductive sheet 200 may be provided to surround at least a part of the battery cell 100. The thermal-conductive sheet 200 may be in surface contact with the battery cell 100. In an example, the thermal-conductive sheet 200 may be provided to surround two surfaces of the pouch case 200 in a first direction and two surfaces thereof in a third direction, among six surfaces of the pouch case 200. The thermal-conductive sheet 200 may be provided so that two sides of the battery cell 100 formed along the second direction 14 are exposed. The thermal-conductive sheet 200 may be made of a material with excellent thermal conductivity. For example, the thermal-conductive sheet 200 may be a graphite sheet. The graphite sheet has excellent thermal conductivity and good electric insulation. If the thermal-conductive sheet 200 is made of a graphite sheet, the heat generated at the battery cell 100 is easily transferred to the cooling plate 400. As an alternative, the thermal-conductive sheet 200 may be made of a silicon thermal-conductive sheet.

The thermal-conductive sheet 200 may be provided in a film form. For example, the thermal-conductive sheet 200 may have a thickness of 50 μm. If the thermal-conductive sheet 200 has a small thickness as above, the total volume of the battery module 10 is not increased. The thermal-conductive sheet 200 having a thin film form has a thickness smaller than a conventional cooling fin made of metal and thus does not increase the total volume of the battery module 10. In addition, it is possible to increase the volume occupied by the battery cells 100 in comparison to the total volume of the battery module 10, thereby improving the energy density.

The side cooling fin 300 may transfer the heat of a side 170 (hereinafter, referred as an edge portion) of the accommodation portion 150 of the battery cell 100 and the heat of the sealing portion 160 to the cooling plate 400. The side cooling fin 300 is located at the inside of the thermal-conductive sheet 200. The battery cell 100 and the side cooling fin 300 may be located side by side along the third direction 16. A plurality of side cooling fins 300 may be provided. The side cooling fin 300 may be provided in a number corresponding to the number of the battery cells 100. At least a part of the side cooling fins 300 may be in contact with the sealing portion 160 of the battery cell 100 and the edge portion 170 of the battery cell 100, and at least a part thereof may be in contact with the thermal-conductive sheet 200. The side cooling fin 300 may be made of metal. For example, the side cooling fin 300 may be made of aluminum. As an alternative, the side cooling fin 300 may be made of another metal with excellent thermal conductivity.

The side cooling fin 300 includes a receiving portion 310, a first ring portion 330 and a second ring portion 350. The receiving portion 310 may receive the sealing portion 160 of the battery cell 100. The receiving portion 310 may have a concave space and receive the sealing portion 160 in the concave space. The sealing portion 160 received in the receiving portion 310 may be inserted in a folded form.

Since the sealing portion 160 is provided in a folded form, the total volume of the battery cell 100 may be reduced. In addition, since the sealing portion 160 is inserted into the receiving portion 310 in a folded form, the sealing portion 160 may be fitted thereto. For example, the receiving portion 310 and the sealing portion 160 may be coupled by fitting. By means of the fitting, the battery cell 100 and the side cooling fin 310 may be coupled more securely.

The first ring portion 330 has a space therein elongating in the second direction 14. A cooling fluid may pass through the inner space of the first ring portion 330. The cooling fluid may cool the first ring portion 330. For example, the cooling fluid may be air. A part of the first ring portion 330 is in contact with the edge portion 170 and the sealing portion 160 of the battery cell 100, respectively, and another part thereof is in contact with the thermal-conductive sheet 200. An edge portion of the first ring portion 330 in contact with the thermal-conductive sheet 200 may be rounded. In addition, a portion of the thermal-conductive sheet 200 in contact with the first ring portion 330 may be rounded. The first ring portion 330 may have an oval section.

Since the portions where the first ring portion 330 and the thermal-conductive sheet 200 are in contact are rounded, it is possible to prevent the thermal-conductive sheet 200 from being torn due to an external impact. In addition, the first ring portion 330 and the thermal-conductive sheet 200 may come into contact with each other in a stable way.

The second ring portion 350 has a space therein elongating in the second direction 14. A cooling fluid may pass through the inner space of the second ring portion 350. The cooling fluid may cool the second ring portion 350. For example, the cooling fluid may be air. The first ring portion 330 and the second ring portion 350 may be coupled to each other by means of the receiving portion 310. A part of the second ring portion 350 is in contact with the edge portion 170 and the sealing portion 160 of the battery cell 100, respectively, and another part thereof is in contact with the thermal-conductive sheet 200. A portion of the second ring portion 350 in contact with the thermal-conductive sheet 200 may be rounded. In addition, a portion of thermal-conductive sheet 200 in contact with the second ring portion 350 may be rounded. The second ring portion 350 may have an oval section. The first ring portion 330 and the second ring portion 350 may be shaped symmetric to each other based on the receiving portion 310.

Since the portions where the second ring portion 350 and the thermal-conductive sheet 200 are in contact are rounded, it is possible to prevent the thermal-conductive sheet 200 from being torn due to an external impact. In addition, the second ring portion 350 and the thermal-conductive sheet 200 may come into contact with each other in a stable way.

The side cooling fin 300 may come into contact with the edge portion 170 and the sealing portion 160 of the battery cell 100 and the thermal-conductive sheet 200 to transfer the heat of the battery cell 100 to the thermal-conductive sheet 200.

In the present disclosure, since the side cooling fin 300 with excellent thermal conductivity is located between the edge portion 170 and the sealing portion 160 of the battery cell 100 and the thermal-conductive sheet 200, the side cooling fin 300 may be in contact with them and transfer the heat of the edge portion 170 and the sealing portion 160 to the thermal-conductive sheet 200 easily.

In other words, in the present disclosure, the heat generated at the battery cell 100 is transferred to the cooling plate 400 through the thermal-conductive sheet 200, and simultaneously the heat of the battery cell 100 is transferred to the cooling plate 400 through the side cooling fin 300. By using such a multi-path heat transfer method, the cooling efficiency of the battery cell 100 may be improved.

In particular, in the present disclosure, the cooling efficiency of the battery cell 100 may be improved by transferring not only the heat generated at a surface of the battery cell 100 but also the heat generated at a side of the battery cell 100 such as the edge portion 170 and the sealing portion 160 of the battery cell 100 to the cooling plate 400.

If the side cooling fin 300 is not provided, a most portion of the edge portion 170 inside the thermal-conductive sheet 200 is not in contact with the thermal-conductive sheet 200. In addition, a part of an end of the sealing portion 160 may be located in contact with the thermal-conductive sheet 200. In this case, the heat generated at the edge portion 170 and the sealing portion 160 of the battery cell 100 may not be transferred to the thermal-conductive sheet 200 easily. If the heat generated at the battery cell 100 is not easily transferred to the cooling plate 400 as described above, the cooling efficiency of the battery cell 100 deteriorates, which may give an influence on the life span of the battery cell 100.

The cooling plate 400 emits the heat transferred from the thermal-conductive sheet 200. The cooling plate 400 is located below the battery cell 100. The battery cell 100, the side cooling fin 300, a portion of the thermal-conductive sheet 200 and the cooling plate 400 may be located in order along the third direction 16. The cooling plate 400 may be made of a material with excellent thermal conductivity. For example, the cooling plate 400 may be made of aluminum.

As an alternative, the cooling plate 400 may be made of another metal material with excellent thermal conductivity.

The cooling plate 400 may have a plurality of accommodation grooves 410 formed therein. The plurality of accommodation grooves 410 may be provided in a number corresponding to the number of the battery cells 100. The plurality of accommodation grooves 410 may be spaced apart from each other at regular intervals along the first direction 12. The accommodation groove 410 may be formed to elongate along the second direction 14. The battery cell 100 surrounded by the thermal-conductive sheet 200 may be coupled to the accommodation groove 410. The accommodation groove 410 may be shaped corresponding to the thermal-conductive sheet 200 surrounding the side cooling fin 300.

By means of the accommodation grooves 410 formed at the cooling plate 400, the contact area of the cooling plate 400 and the thermal-conductive sheet 200 may be increased. In addition, the accommodation grooves 410 may enhance the coupling force between the cooling plate 400 and the battery cell 100 surrounded by the thermal-conductive sheet 200.

The heat sink 600 may exchange heat with the cooling plate 400. The heat sink 600 is located below the cooling plate 400 in the third direction 16.

The heat sink 600 has a chamber 610. The chamber 610 may have a cross-sectional area identical to or greater than that of the cooling plate 400. The chamber 610 may have a flow path (not shown) formed therein. A cooling fluid may flow through the flow path. As an example, the cooling fluid may be cooling water. Alternatively, the cooling fluid may be air. The chamber may have an inlet pipe (not shown) through which the cooling fluid flows in and an outlet pipe (not shown) through which the cooling fluid flows out.

The battery pack according to the present disclosure may include at least one battery module 10 described above. In addition to the battery module 10, the battery pack may further include a case for accommodating the battery module 10, and various devices for controlling charge/discharge of the battery module 10. For example, a battery management system (BMS), a current sensor, a fuse, and the like may be further included.

The battery module 10 according to the present disclosure may be applied to vehicles such as electric vehicles and hybrid vehicles. The vehicle according to the present disclosure may include at least one battery pack including the battery module 10 according to the embodiment in the present disclosure.

Figure 7:
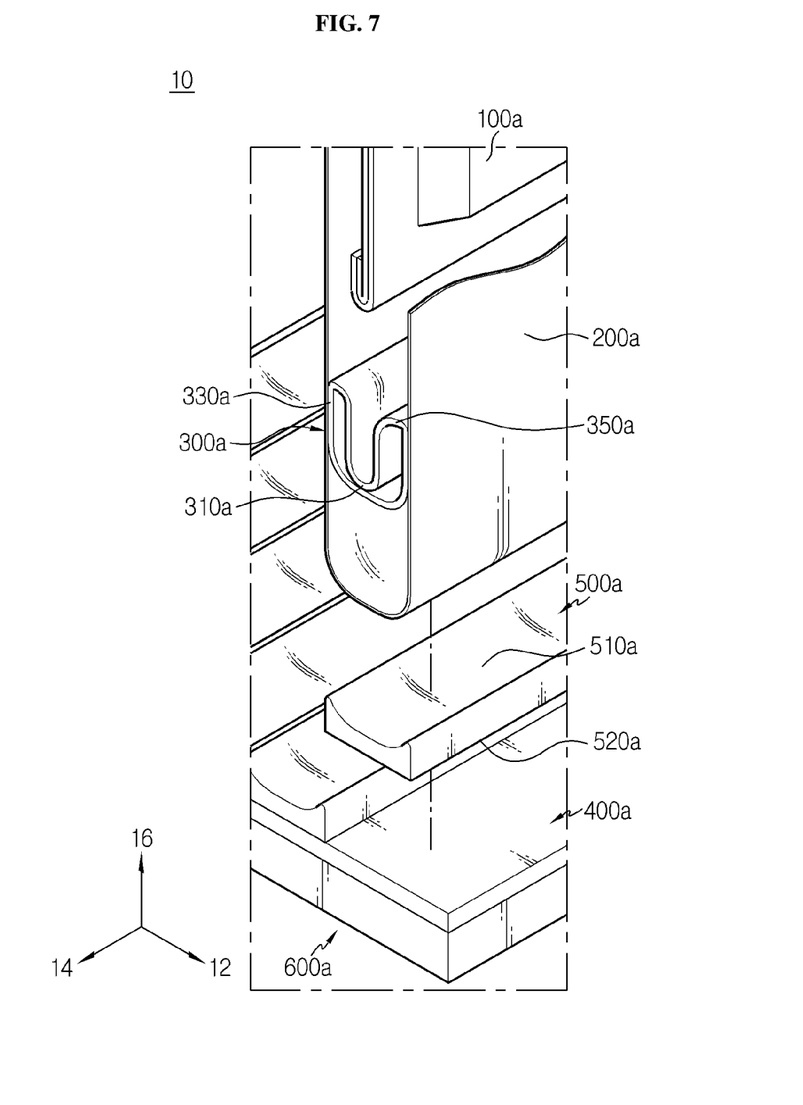
FIG. 7 is a perspective view showing another embodiment of the battery module of FIG. 4.
Figure 8:
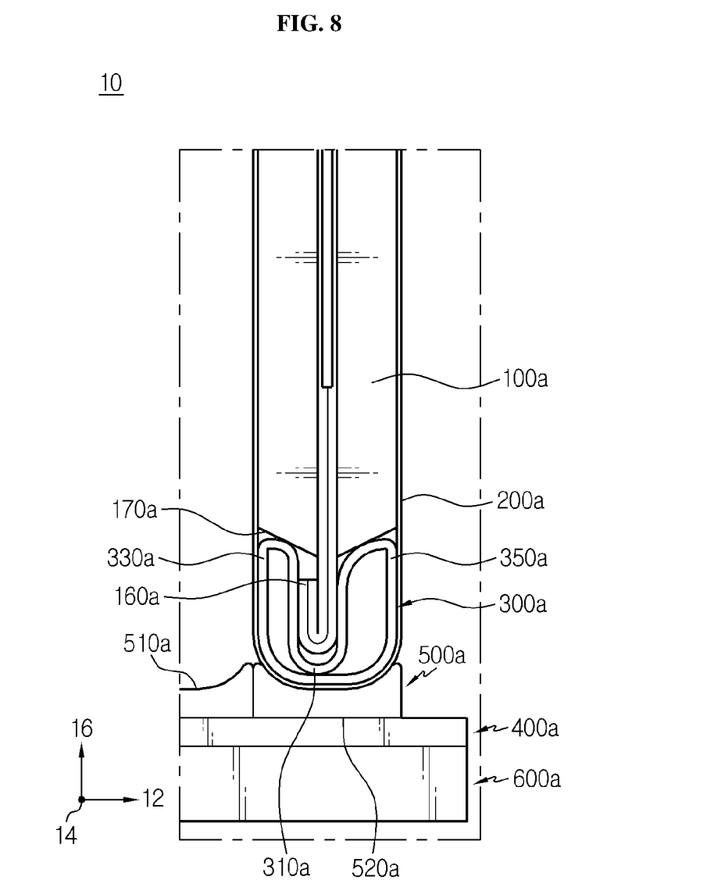
FIG. 8 is a front view showing the battery module of FIG. 4, in which the battery cells, the thermal-conductive sheet, the side cooling fins, the cooling pad, the cooling plate and the heat sink are coupled.
Figure 9:
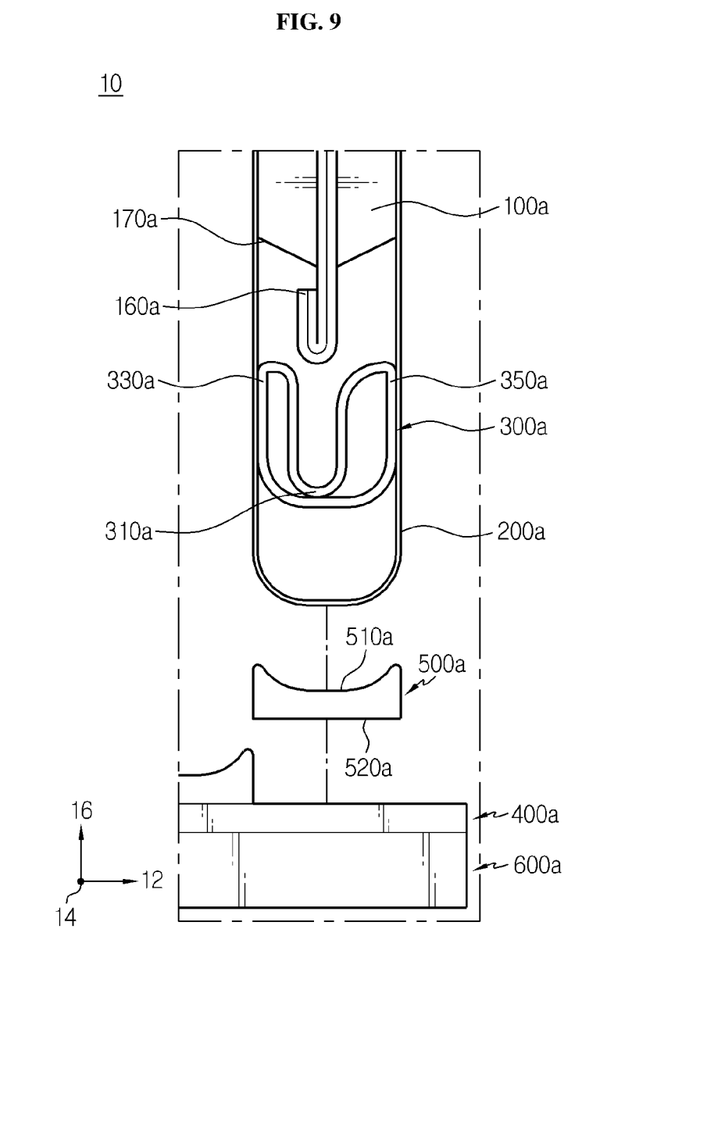
FIG. 9 is a front view showing a state before the battery cells, the thermal-conductive sheet, the side cooling fins, the cooling pad, the cooling plate and the heat sink of FIG. 8 are coupled.

FIG. 7 is a perspective view showing another embodiment of the battery module of FIG. 4, FIG. 8 is a front view showing the battery module of FIG. 4, in which the battery cells, the thermal-conductive sheet, the side cooling fins, the cooling pad, the cooling plate and the heat sink are coupled, and FIG. 9 is a front view showing a state before the battery cells, the thermal-conductive sheet, the side cooling fins, the cooling pad, the cooling plate and the heat sink of FIG. 8 are coupled.

Referring to FIGS. 7 to 9, a battery module 10a according to another embodiment of the present disclosure includes a battery cell 100a, a thermal-conductive sheet 200a, a side cooling fin 300a, a cooling plate 400a, a cooling pad 500a and a heat sink 600a.

The battery cell 100a, the thermal-conductive sheet 200a, the side cooling fin 300a and the heat sink 600a of FIG. 7 may be substantially identical to the battery cell 100, the thermal-conductive sheet 200, the side cooling fin 300 and the heat sink 600 of FIG. 1.

The cooling plate 400a may be substantially identical to the cooling plate 400 of FIG. 1. However, different from the cooling plate 400 of FIG. 1, the cooling plate 400a does not have the accommodation groove 410. A surface 520a of the cooling plate 400a in contact with the cooling pad 500a, explained later, may be a flat surface. One surface of the cooling plate 400a is in contact with the cooling pad 500a, and the other surface thereof is in contact with the heat sink 600a.

The cooling pad 500a may transfer the heat transferred from the thermal-conductive sheet 200a to the cooling plate 400a. The cooling pad 500a may fix the battery cell 100a surrounded by the thermal-conductive sheet 200a. One surface 510a of the cooling pad 500a may be coupled to the thermal-conductive sheet 200a, and the other surface 520a of the cooling pad 500a may be coupled to the cooling plate 400. The battery cell 100a, the side cooling fin 300a, a part of the thermal-conductive sheet 200a, the cooling pad 500a and the cooling plate 400a may be located in order along the third direction 16. The surface 510a of the cooling pad 500a coupled to the thermal-conductive sheet 200 may have a concave shape. Since the surface of the cooling pad 500a has a concave shape, a contact area with the thermal-conductive sheet 200a is increased, which may enhance the coupling force. The surface 520a of the cooling pad 500a in contact with the cooling plate 400a may be a flat surface.

A plurality of cooling pads 500a may be provided. The cooling pads 500a may be provided in a number corresponding to the number of the battery cells 100a. The cooling pad 500a may be made of a thermal interface material. As an alternative, the cooling pad 500a may be made of a material with excellent thermal conductivity and good adhesion.

By providing the cooling pad 500a to the battery module 10a, the coupling force between each battery cell 100a and the cooling plate 400a may be enhanced. In addition, by providing the cooling pad 500a, the heat of the thermal-conductive sheet 200a may be transferred to the cooling plate 400a, thereby improving the cooling efficiency of the battery cell 100a.

Though not shown in the figures, a coupling groove (not shown) may be formed at the cooling plate 400a so that the cooling pad 500a is inserted thereto. The coupling groove may have a concave shape downwards in the third direction 16. If the cooling plate 400a has the coupling groove, the contact area between the cooling pad 500a and the cooling plate 400a may be increased, thereby enhancing the coupling force thereof.

Figure 10:
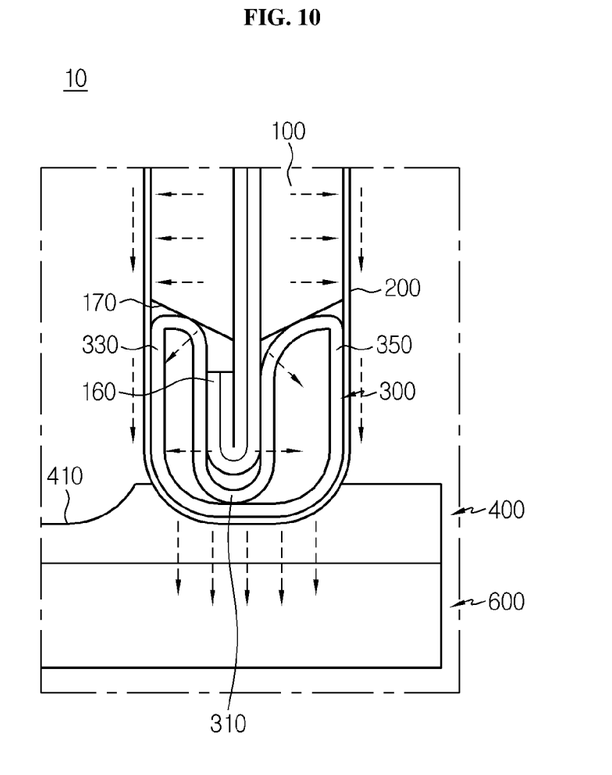
FIG. 10 is a schematic view showing a direction in which heat is transferred in the battery module according to an embodiment of the present disclosure.

FIG. 10 is a schematic view showing a direction in which heat is transferred in the battery module according to an embodiment of the present disclosure. Hereinafter, referring to FIG. 10, a process of cooling the battery cell 100 at the battery module 10 according to an embodiment of the present disclosure will be described. In FIG. 10, arrows indicate the direction in which heat is transferred.

In the present disclosure, the heat generated at the battery cell 100 may be transferred to the cooling plate through various paths to improve the cooling efficiency.

First, the heat generated at the battery cell 100 is transferred to the thermal-conductive sheet 200 which is in surface contact with the battery cell 100. The heat transferred to the thermal-conductive sheet 200 is transferred to the cooling plate 400, and the cooling plate 400 exchanges the heat with the heat sink 600 to emit the heat.

In addition, the heat generated at the edge portion 170 and the sealing portion 160 of the battery cell 100 is emitted along two paths.

First, the edge portion 170 and the sealing portion 160 of the battery cell 100 are in contact with the side cooling fin 300. The side cooling fin 300 has a space therein. A cooling fluid may flow through the inner space. The heat of the edge portion 170 and the sealing portion 160 of the battery cell 100 may be emit to the outside by means of the cooling fluid flowing in the inner space of the side cooling fin 300. In other words, the heat transferred to the side cooling fin 300 may be discharged out by means of air-cooling.

Second, the heat generated at the edge portion 170 and the sealing portion 160 of the battery cell 100 is transferred to the side cooling fin 300, and the side cooling fin 300 transfers the heat to the thermal-conductive sheet 200. The heat transferred to the thermal-conductive sheet 200 may be discharged out through the cooling plate 400 and the heat sink 600.

As described above, in the present disclosure, the heat of the battery cell 100 may be effectively cooled by means of the side cooling fin 300. In particular, since it is possible to cool the heat of the edge portion 170 and the sealing portion 160 of the battery cell 100 located at the inside of the thermal-conductive sheet 200 and not in direct contact with the thermal-conductive sheet 200 by means of the side cooling fin 300, the cooling efficiency of the battery cell 100 may be improved.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

What is claimed is:

1. A battery module, comprising:
   a plurality of battery cells, each having an accommodation portion in which an electrode assembly is accommodated and a sealing portion for sealing the accommodation portion;
   a thermal-conductive sheet configured to surround at least a part of the battery cells in surface contact with the battery cells;
   a side cooling fin located at an inner side of the thermal-conductive sheet and at least partially in contact with the accommodation portions of the battery cells; and
   a cooling plate in contact with the thermal-conductive sheet,
   wherein the side cooling fin includes:
      a receiving portion in which the sealing portion is received;
      a first ring portion in contact with one side surface of the sealing portion; and
      a second ring portion in contact with the other side surface of the sealing portion,
      wherein the first ring portion and the second ring portion are connected to each other by the receiving portion.

2. The battery module according to claim 1, wherein at least a first part of the side cooling fin is in contact with the sealing portions of the battery cells, and at least a second part of the side cooling fin is in contact with the thermal-conductive sheet.

3. The battery module according to claim 1, wherein the first ring portion and the second ring portion respectively have an empty space therein and are formed to have one open side.

4. The battery module according to claim 1, wherein the first ring portion and the second ring portion are symmetric to each other based on the receiving portion.

5. The battery module according to claim 1, wherein the sealing portion is disposed in a folded form at the receiving portion.

6. The battery module according to claim 1, wherein at least a part of each of the first ring portion and the second ring portion is in contact with a side surface of the accommodation portion of the battery cell, the sealing portion, and the thermal-conductive sheet.

7. The battery module according to claim 6, wherein portions of the thermal-conductive sheet respectively in contact with the first ring portion and the second ring portion have a rounded shape.

8. The battery module according to claim 1, wherein the thermal-conductive sheet is a graphite sheet, and wherein the side cooling fin is made of aluminum.

9. The battery module according to claim 1, wherein the battery cell, the side cooling fin and the cooling plate are disposed side by side in order along a first direction, and wherein the thermal-conductive sheet is provided to surround both a portion of a surface of the battery cell perpendicular to the first direction and at least a portion of a side surface of the side cooling fin.

10. The battery module according to claim 1, further comprising:
   a cooling pad located between the thermal-conductive sheet and the cooling plate to transfer heat of the thermal-conductive sheet to the cooling plate.

11. The battery module according to claim 10, wherein one surface of the cooling pad is coupled to the thermal-conductive sheet, the other surface of the cooling pad is coupled to the cooling plate, and the thermal-conductive sheet coupled to the cooling pad has a rounded shape.

12. The battery module according to claim 1, further comprising:
   a heat sink in which a cooling fluid flows to exchange heat with the cooling plate.

13. A battery pack, comprising a battery module defined in claim 1.

14. A vehicle, comprising a battery pack defined in claim 13.